June 9, 1964  E. J. SCROGGINS  3,136,087
LIVE BAIT BUCKET OXYGENATOR
Filed Oct. 8, 1962  2 Sheets-Sheet 1
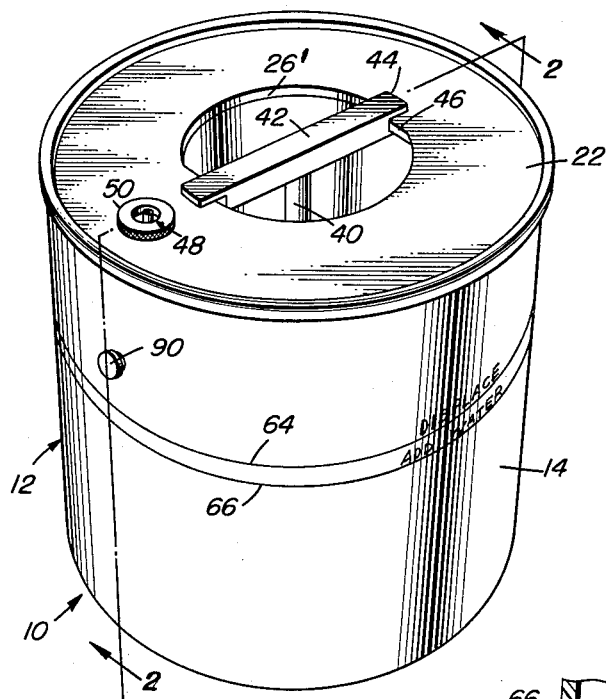
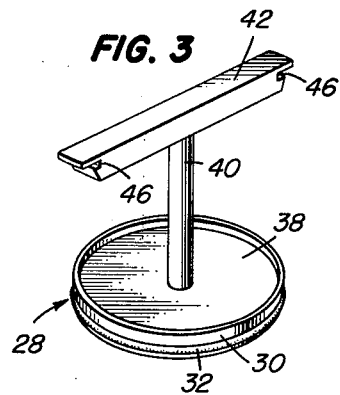
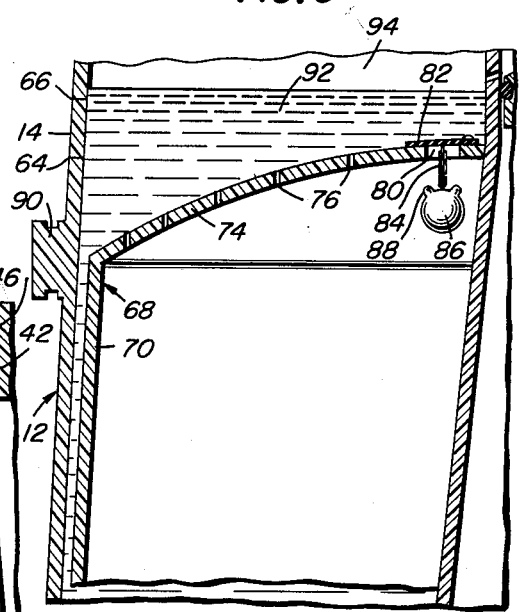
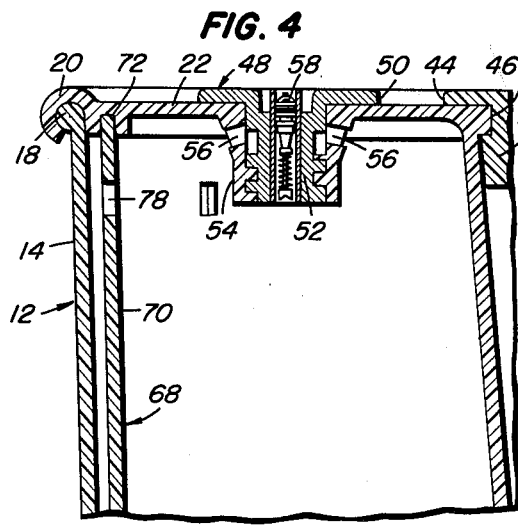
INVENTOR.
Elva J. Scroggins
BY
*Gustav Miller*
ATTORNEY June 9, 1964     E. J. SCROGGINS     3,136,087
LIVE BAIT BUCKET OXYGENATOR
Filed Oct. 8, 1962     2 Sheets-Sheet 2
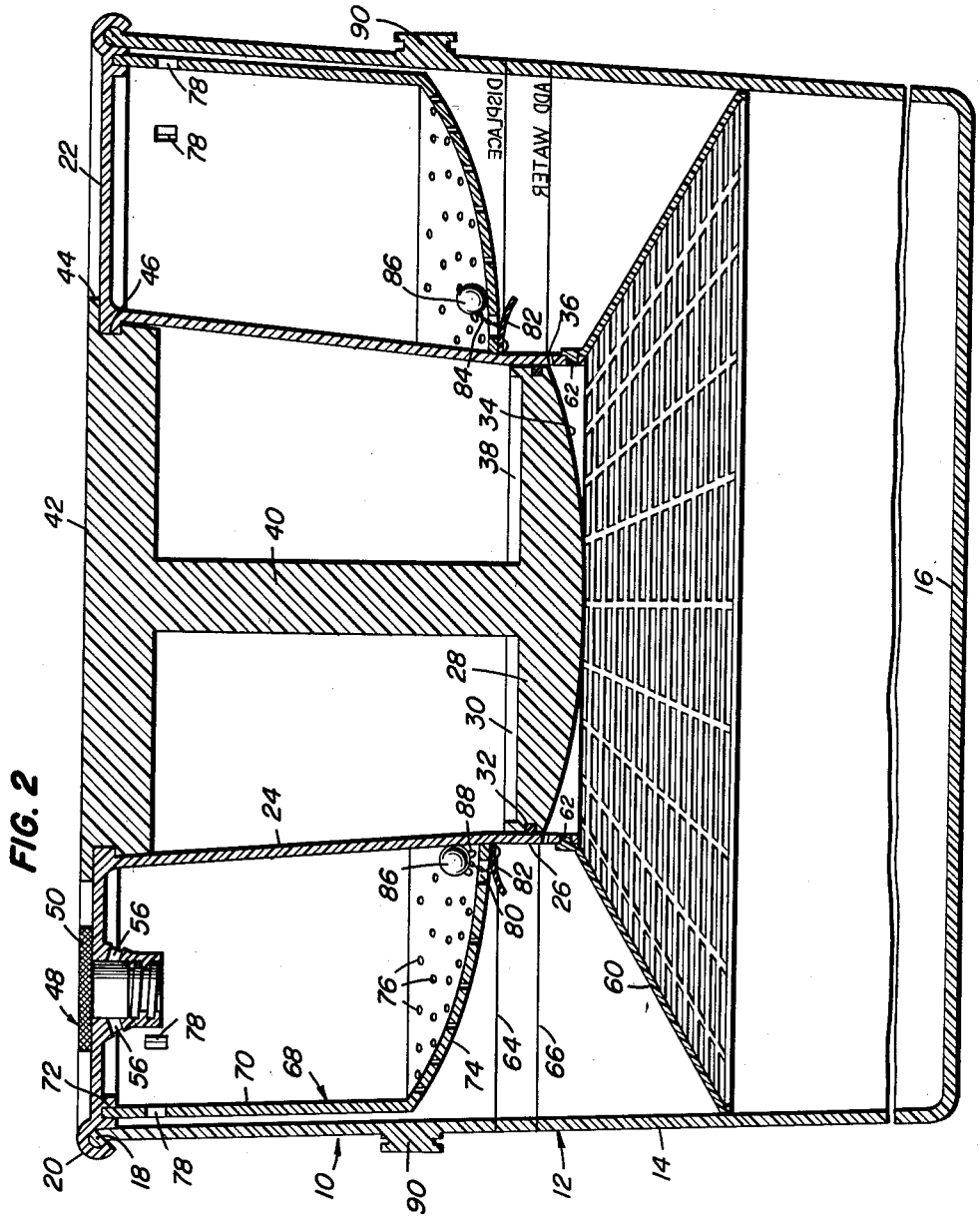
INVENTOR.
Elva J. Scroggins
BY
Gustave Miller
ATTORNEY United States Patent Office
3,136,087
Patented June 9, 1964

3,136,087
LIVE BAIT BUCKET OXYGENATOR
Elva J. Scroggins, 528 Doris St., New Iberia, La.
Filed Oct. 8, 1962, Ser. No. 228,921
10 Claims. (Cl. 43—57)

This invention relates to a live bait bucket oxygenator and has for an object to provide a bucket in which live fish bait can be carried and kept alive indefinitely and in which the water or liquid may be readily oxygenated by merely inverting the bucket and keeping in inverted position, and, if desired, occasionally turned right side up and then reinverted so as to continuously oxygenate the water, making it possible to readily remove the fish bait from time to time as needed without any substantial loss of oxygen or air from the oxygenated bucket.

A further object of this invention is to provide a live fish bait bucket oxygenator wherein preferably oxygen but even atmospheric air may be used to oxygenate the water and wherein the bucket is made preferably of a molded material that is at least translucent, if not transparent, and is provided with minimum and maximum level indicator means so that the water may be maintained at the desired optimum level, together with a cooperating valve and closure means which also serves as a ladle for replenishing the water as bait is removed from time to time necessarily involving slight loss of the water at each removal.

Still a further object of this invention is to provide a live bait bucket oxygenator which may be caused to oxygenate the water by the mere process of inverting the bucket and maintaining it in inverted position to thereby cause the oxygen or air to slowly permeate the water when the bucket is inverted and to provide an oxygen or air cushion on the top thereof when the bucket is in inverted position for nibbling by the bait.

Still a further object of this invention is to provide a live bait bucket oxygenator having an attachable air or oxygen bubbler which when placed therein causes the oxygen or air to slowly bubble through the water when the bucket is inverted and when the bucket is again placed right side up, as for removing the bait, the water will drain quickly from the bubbler back to the bottom of the bucket and the oxygen or air will return quickly to the bubbler area.

Still a further object of this invention is to provide a live fish bait bucket oxygenator having a readily removable closure and valve member through which the bait is introduced to and removed from the bucket, to provide an annular passageway for keeping the live bait in the bucket easily available through the annular passageway.

Still a further object of this invention is to provide a live bait bucket oxygenator made of suitable molded material which is slightly resilient so that the various parts can snap together or snap apart so that they may be readily disassembled for individual cleaning.

With the above and related objects in view, this invention consists in the details of construction and combination of parts, as will be more fully understood from the following description, when read in conjunction with the accompanying drawings in which:

FIG. 1 is a perspective view of the live bait bucket oxygenator of this invention in upright position.

FIG. 2 is a sectional view on enlarged scale on line 2—2 of FIG. 1.

FIG. 3 is a perspective view of the combination closure valve and ladle.

FIG. 4 is a sectional view on a still larger scale than FIG. 2, through the oxygen introducing valve and associated parts, as on line 2—2 of FIG. 1.

FIG. 5 is a fragmentary sectional view through the bubbler and associated parts of the bucket in inverted position.

There is shown at 10 the live bait bucket oxygenator of this invention as comprising a bucket 12 made preferably of slightly resilient molded material that is at least translucent, if not transparent, and having a slightly tapered annular side wall 14 and bottom wall 16, the top end of the side wall 14 being provided with a bead 18 for cooperating with an annular recessed edge 20 of an annulus top wall 22. The annulus top wall 22 has a tapered wall 24 integrally depending from the inner circumference 26′ thereof and terminating at its bottom end in a cylindrical wall 26 providing a valve seat as will be hereinafter set forth.

Cooperating with this valve seat 26 and providing a closure member for the bucket 12 is a disc-like valve plug 28 having an edge 30 which is recessed and provided with a sealing O-ring 32 providing a tight seal between the plug 28 and the valve seat 26. The bottom of the disc-like plug 28 is convex as shown at 34 and the cylindrical valve seat 26 is provided with a plurality of oxygen escape ports 36 extending in a ring adjacent to the position of the end of the convex side 34 of the valve plug 28 when in closed position. The upper side of the plug 28 is recessed as at 38 and this recess 38 cooperating with the stem 40 and the crossbar 42 on the top of stem 40 makes the plug 28 also a combination ladle for replenishing water in the bucket as needed. The crossbar 42 and the inner circumference end of annulus top wall 22 and top of tapered wall 24 have what is in effect a cooperating interrupted screw thread means at 44 and 46 for securely locking the valve plug 28 in closure position.

The length of the stem means 40 is such that after the sealing O-ring gasket 32 contacts the cylindrical valve seat 26, it must be pushed further down until the cooperating threads 44 and 46 can be operated to lock the seal in place.

Extending through the annulus top wall 22 is the oxygen introducing valve 48 having a knurled flange at 50 to facilitate its removal and replacement as desired. The valve 48 consists of a large threaded sleeve 52 depending from the flange which may be threaded through a cooperating threaded tube 54 depending from the bottom side of the annulus top wall 22. This threaded tube 54 is provided adjacent the annulus top wall 22 with four spaced ports 56 for use when completely filling or emptying the bucket 12. Removably secured through the valve sleeve 52 is a valve stem and core 58 of the type conventionally used in automobile and bicycle tires which will cooperate with an oxygen tube or air pressure pump for inserting oxygen or air therethrough as desired.

Depending from the lower end of the cylindrical valve seat 26 is a frusto-conical shaped screen 60 which flares downwardly and outwardly to adjacent the inner surface of the bucket wall 14 for confining the live fish bait therebelow and keeping the bait readily accessible to the annular passageway through the tapered wall 24 when the closure valve plug 28 has been removed. As will be observed, this frusto-conical screen 60 is detachably secured to the valve seat 26 by means of internally extending bosses 62 which can pop or snap into cooperating apertures formed through the end of the cylindrical valve seat 26.

As thus far described, the live bait bucket oxygenator is a complete and operative device when charged with oxygen. To be equally effective with either atmospheric air or oxygen a bubbler 68 may also be included, this bubbler 68, of course, adding somewhat to the cost of the article. When air is used the unit would have to be inverted and reinverted much more often than with oxygen to keep the liquid or water oxygenated within the bucket 12. The bubbler 68 enables the oxygen or air to permeate the water more slowly and thus much more effectively. The bubbler 68 consists of an annular wall 70, having a taper corresponding to the taper of the bucket wall 14, detachably secured in the annular recess 72 provided on the underside of the annulus top wall 22 adjacent its outer circumference. At the bottom of the bubbler annular wall 70, as viewed in upright position, there is provided a concave shaped foraminated bottom wall 74 having numerous small foramina 76 therethrough. Adjacent the upper edge of the annular wall 70, there are provided approxiimately twelve oxygen or air relief ports 78, and adjacent the inner circumference of the foraminated bottom wall 74 there are provided approximately twelve check valved ports 80 adapted to be closed when the bucket is inverted by a seal flap 82 connected by a tether or flexible connection 84 to a weight 86, the weight 86 being provided with a plurality of extending bosses 88 to insure that the weight 86 cannot accidentally close the port 80.

It will be noted that the bucket 12 is provided with a maximum water level indicator at 64 and a minimum water level indicator at 66, both of which lines have appropriate indicia thereon such as the word, "Displace" along the maximum level indicator line 64 and the words, "Add Water," at minimum water level indicator line 66, such indicator lines cooperating with the surface of the level of the water visible through the bucket 12 which, as before stated, is at least translucent, if not transparent.

In operation, the valve plug 28 and the oxygen introducing valve sleeve 52 are first removed, and the bucket then completely filled with water. Then, still in upright position, the valve sleeve 52 is replaced and oxygen or air is slowly introduced through the valve stem 58 until the water level has dropped down to the "Displace" maximum water level line at 64.

When the level of the water has been forced down by the oxygen or air pressure to the maximum level indicator line 64 the seal plug 28 is introduced through the tapered annular wall 24 until it reaches the cylindrical valve seat 26. It is forcibly pushed down further into the cylindrical valve seat 26, somewhat compressing the oxygen or air as necessary, until the cooperating interrupted threads 44 and 46 can be brought together by rotating the crossbar 42 to lock and seal the closure in position.

After the seal plug 28 is securely positioned and locked by means of the cooperating interrupted threads 44 and 46, the water standing above the seal plug 28 needs to be poured out of the annular passageway. Upon setting the bucket back upright, and after momentary pause to allow passage of any oxygen or air back to the bubbler 68 through the ports 78, and drainage of any water from the bubbler 68 through the ports 80 which are no longer closed by the weights 86 acting upon the flap valves 82 when in the upright position, the seal plug 28 can be removed and the live bait placed into the water within the bucket. Upon again replacing and securing the seal plug 28, the live bait bucket oxygenator is fully serviced, stocked and ready for use.

Where oxygen has been the charging gas, the bucket can be maintained in its inverted position for indefinite periods of time due to ability by the bait to nibble at the cushion of oxygen existing above the surface of the water. Where air is the gas being used, by necessity the bucket must be inverted and reinverted frequently to allow oxygenation of the water by means of the bubbler 68. To facilitate the various inversions of the bucket, bail bosses 90 are present on the outside of the bucket wall 14, to cooperate with a suitable combination carrying bail-stand.

When the bucket is inverted the flap valves 82 seal against foraminated bottom wall 74 of the bubbler 68, being held sealed by the weights 86. The foramina 76 permit escape of the oxygen or air from the bubbler 68 and allows the oxygen or air to slowly permeate up (as seen in FIG. 5) through the water 92, oxygenating the water 92 as it goes on up to form an oxygen or air cushion at 94 at which the bait can nibble.

When the bucket is returned to its upright position, either to repeat the oxygenation process or to remove bait, the weights 86 relax their holding action of the flap valves 82 and permit the flap valves 82 to open beneath the weight of the water in the bubbler 68 which quickly drains through the ports 80. To further expedite the drainage of the water from the bubbler 68, the relief ports 78 adjacent the upper edge of the annular wall 70 permit rapid passage of the oxygen or air from the annular spaced between the annular wall 70 and the bucket wall 14, the oxygen or air being directed to the annular space between the annular wall 70 and the bucket wall 14 by the concave surface of the foraminated bottom wall 74 of the bubbler 68. Any oxygen or air that may be trapped within the edge of the cylindrical valve seat 26 is led by the concave surface 34 of the seal plug 28 to the ports 36 thence as the other oxygen or air to the relief ports 78 into the bubbler 68.

In the preferred form, the bubbler 68 will be used to allow optional use of oxygen or air, but as explained above, if the bubbler 68 is omitted in order to reduce the cost, the live bait bucket oxygenator can only be considered feasibly effective when charged with oxygen.

Although this invention has been described in considerable detail, such description is intended as being illustrative rather than limiting, since the invention may be variously embodied, and the scope of the invention is to be determined as claimed.

I claim:

1. A live bait bucket oxygenator comprising a bucket having side and bottom walls and an open top end, an annulus top wall secured to the open end thereof, an annular tapered wall depending from the inner circumference part of said annulus top wall in spaced relation to the bucket annular wall, said annular tapered wall terminating in a cylindrical wall providing an annular valve seat spaced substantially from the bucket bottom wall, a bait retainer screen, substantially frusto-conical in shape, flaring downwardly and outwardly from said cylindrical wall and to closely adjacent to said bucket side wall, a valve member cooperating with said annular valve seat providing a closure member for said bucket, said closure member comprising a disc-like valve plug, a valve sealing edge on said disc-like valve plug, stem means extending upwardly from said valve plug, a crossbar extending from said stem means, cooperating screw threaded means on said crossbar and said annulus top and tapered walls for removably securing said valve plug in closure position, and a gas introducing valve extending through said annulus top wall.

2. The oxygenator of claim 1, and an oxygen bubbler comprising an annular wall depending from said annulus top wall adjacent its outer circumference, and a foraminated wall extending from said latter annular wall to substantially contact said depending tapered annular wall.

3. The oxygenator of claim 2, said foraminated wall having a plurality of check valved ports therethrough permitting rapid flow of liquid downwardly therethrough when said bucket is in upright position, and said bubbler annular wall having a plurality of gas passing ports therethrough adjacent its depending top end, both said plurality of ports being substantially larger than the foramina in said foraminated wall.

4. The oxygenator of claim 3, said check valved ports having a seal flap valve on the bottom thereof, and a valve closing weight connected thereto and located above said foraminated wall when in upright position for closing said seal flap valve when said bucket is in inverted position.

5. The oxygenator of claim 1, said gas introducing valve comprising a threaded tube depending from said annulus top wall into said bucket, said tube having drain ports therethrough adjacent said annulus top wall, a valve sleeve removably threaded through said threaded sleeve, and valve core and stem means extending through said valve sleeve.

6. The oxygenator of claim 1, said valve plug closure member having a ladle recess on the stem means side thereof for use in replenishing liquid in said bucket.

7. The oxygenator of claim 6, the opposite side of said disc-like valve plug closure being convex, and said annular valve seat having gas escape port means adjacent the edge of said convex side of said disc-like valve plug closure when in closed position.

8. The oxygenator of claim 1, said bucket being of material that is at least translucent, and spaced apart maximum and minimum liquid level indicator means on bucket side wall.

9. The oxygenator of claim 1, said bucket being of slightly resilient molded material, said bucket and said annulus top having cooperating snap together bead and annular recess means.

10. The oxygenator of claim 2, said bucket and said annulus top wall being of slightly resilient molded material having cooperating snap together head and annular recess means and said annulus top having an annular recess receiving and detachably holding said bubbler annular wall therein.

References Cited in the file of this patent

UNITED STATES PATENTS 3,000,132    Koistinen   ---------------- Sept. 19, 1961

FOREIGN PATENTS 871,385    Great Britain   ------------ June 28, 1961